United States Patent
Wang et al.

(10) Patent No.: US 9,808,856 B2
(45) Date of Patent: Nov. 7, 2017

(54) APPARATUS AND METHODS FOR REDUCING CORROSION OF JOINING COMPOSITE WORKPIECES

(71) Applicants: Pei-Chung Wang, Troy, MI (US); Chen-Shih Wang, Troy, MI (US); Ingrid A. Rousseau, Clinton Township, MI (US)

(72) Inventors: Pei-Chung Wang, Troy, MI (US); Chen-Shih Wang, Troy, MI (US); Ingrid A. Rousseau, Clinton Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 198 days.

(21) Appl. No.: 14/496,829

(22) Filed: Sep. 25, 2014

(65) Prior Publication Data

US 2016/0091009 A1    Mar. 31, 2016

(51) Int. Cl.
*F16B 19/10*     (2006.01)
*B21J 15/02*     (2006.01)
(Continued)

(52) U.S. Cl.
CPC ........... *B21J 15/027* (2013.01); *B21J 15/147* (2013.01); *F16B 19/008* (2013.01); *F16B 19/04* (2013.01)

(58) Field of Classification Search
CPC ........ B21J 15/027; B21J 15/04; B21J 15/043; B21J 15/048; B21J 15/147; F16B 19/083; (Continued)

(56) References Cited

U.S. PATENT DOCUMENTS

| | | | |
|---|---|---|---|
| 4,978,270 A | * | 12/1990 | Ackerman ............ B21J 15/025 29/520 |
| 5,195,855 A | | 3/1993 | Atkinson et al. |

(Continued)

FOREIGN PATENT DOCUMENTS

| | | | | |
|---|---|---|---|---|
| JP | WO 2012117737 A1 | * | 9/2012 | ............ F16B 19/086 |
| JP | 2013245772 | * | 12/2013 | |

OTHER PUBLICATIONS

Sergio T. Amancio-Fiho, Friction Riveting (FricRiveting). Development of a New Joining Technique for Polymer-Metal Hybrid Joint. Part 1: Process and Microstructure.
(Continued)

*Primary Examiner* — John C Hong
(74) *Attorney, Agent, or Firm* — Mickki D. Murray; Parks IP Law LLC

(57) ABSTRACT

The present disclosure relates a rivet body, including a rivet head and a rivet shank, composed of a different material than a mandrel used for insertion into a workpiece(s), the mandrel including a mandrel shaft and a mandrel cap. The rivet body receives the mandrel shaft, including the mandrel cap, through the rivet shank. The mandrel shaft is received by the installation tool, which rotates the rivet body, and the mandrel cap locally deforms workpieces(s) through friction riveting to install the rivet body. During the friction riveting, the fast-rotating rivet body is pushed into the workpiece(s) causing local deformation/melting where the mandrel cap contacts the workpiece(s). The mandrel cap creates a cavity which progresses through an upper surface and a lower surface of the workpiece(s).

20 Claims, 2 Drawing Sheets

(51) Int. Cl.
  *B21J 15/14* (2006.01)
  *F16B 19/00* (2006.01)
  *F16B 19/04* (2006.01)

(58) Field of Classification Search
  CPC  F16B 19/086; F16B 19/1045; F16B 19/1054; B29C 65/0672; B29C 65/069; Y10T 29/49943; Y10T 29/49956; Y10T 29/49957; Y10T 29/49968
  See application file for complete search history.

(56) References Cited

U.S. PATENT DOCUMENTS

| | | | | |
|---|---|---|---|---|
| 5,354,160 | A * | 10/1994 | Pratt | B21J 15/00 29/243.521 |
| 6,325,584 | B1 * | 12/2001 | Marko | B21J 15/025 411/179 |
| 6,527,491 | B1 * | 3/2003 | Uchimoto | B21J 15/025 411/504 |
| 6,572,007 | B1 * | 6/2003 | Stevenson | B23K 20/128 228/112.1 |
| 6,640,414 | B2 * | 11/2003 | Stevenson | B21J 15/027 228/112.1 |
| 6,676,007 | B2 * | 1/2004 | Stevenson | B23K 20/127 228/112.1 |
| 6,702,535 | B1 * | 3/2004 | Stevenson | B21J 15/02 29/525.14 |
| 6,729,531 | B2 * | 5/2004 | Stevenson | B21J 15/027 228/112.1 |
| 6,883,699 | B2 * | 4/2005 | Stevenson | B23K 20/122 228/112.1 |
| 6,892,924 | B2 * | 5/2005 | Stevenson | B21J 15/027 228/112.1 |
| 6,988,651 | B2 * | 1/2006 | Stevenson | B21J 15/027 228/112.1 |
| 7,013,768 | B2 * | 3/2006 | Stevenson | B23K 20/122 81/436 |
| 7,695,227 | B2 * | 4/2010 | Stevenson | F16B 37/061 228/114.5 |
| 7,862,271 | B2 | 1/2011 | Wang et al. | |
| 8,721,241 | B2 * | 5/2014 | Jokisch | F16B 19/083 411/29 |
| 2003/0135974 | A1 * | 7/2003 | Stevenson | B21J 15/027 29/456 |
| 2003/0136810 | A1 * | 7/2003 | Stevenson | B23K 20/127 228/112.1 |
| 2003/0192940 | A1 * | 10/2003 | Stevenson | B21J 15/027 228/112.1 |
| 2004/0118900 | A1 * | 6/2004 | Stevenson | B21J 15/027 228/114.5 |
| 2004/0232209 | A1 | 11/2004 | Stol et al. | |
| 2005/0178816 | A1 * | 8/2005 | Stevenson | B21J 15/027 228/112.1 |
| 2006/0024145 | A1 * | 2/2006 | Wang | B21J 5/066 411/34 |
| 2006/0039778 | A1 * | 2/2006 | Palm | F16B 19/086 411/455 |
| 2006/0175381 | A1 * | 8/2006 | Wang | B21J 15/027 228/112.1 |
| 2006/0236739 | A1 * | 10/2006 | Smith | B21J 15/027 72/67 |
| 2006/0251489 | A1 * | 11/2006 | Denham | F16B 29/00 411/34 |
| 2007/0116538 | A1 * | 5/2007 | Wang | B21J 5/066 411/60.1 |
| 2008/0107499 | A1 * | 5/2008 | Denham | F16B 29/00 411/548 |
| 2011/0164945 | A1 | 7/2011 | Lathabai et al. | |
| 2015/0143686 | A1 * | 5/2015 | Blacket | B21J 15/027 29/525.06 |
| 2016/0091009 | A1 * | 3/2016 | Wang | B21J 15/147 29/524.1 |

OTHER PUBLICATIONS

S.T. Amancio-Fiho & J.F. dos Santos; Development of Fric Riveting as a new joining technique for polymer and lightweight alloys.

* cited by examiner

APPARATUS AND METHODS FOR REDUCING CORROSION OF JOINING COMPOSITE WORKPIECES

TECHNICAL FIELD

The present disclosure relates generally to joining workpieces similar or dissimilar in material. More specifically, the present disclosure relates to reducing galvanic corrosion caused by electrochemical pathways created between the workpieces by mechanical fasteners.

BACKGROUND

Using rivets as mechanical fasteners to join components (e.g., sheets of material) is widespread in many industries. In recent years, polymer based composite materials have been widely used within applications for purposes such as decreasing weight components and fasteners.

Fast, easy-to-use rivets allow for relatively speedy assembly, consistent mechanical performance and streamlined installed appearance, making riveting a reliable and economical assembly method in areas such as assembly of bridge components and joining of automotive workpieces. Rivets are regularly used with similar dissimilar metals such as combinations amongst aluminum, stainless steel, and copper, among others.

Before being installed, a rivet body (e.g., a blind rivet) consists of a rivet head and a smooth cylindrical rivet shank. The rivet body is set using a mandrel, driven through the rivet body. Upon installation, the rivet body is placed into an installation tool and then inserted into a punched or pre-drilled hole within the workpiece. Activating an installation tool pulls the mandrel into the rivet body and securely clamps the workpieces together. When the mandrel reaches a predetermined break-load, the mandrel breaks away and is removed from the set rivet body. A small portion of the mandrel remains in the bottom of the rivet shank to ensure the clamping force is retained in the joint. In final form, the rivet shank is deformed (known as upsetting), so that the rivet shank expands larger than the original rivet shank diameter, thus holding the rivet body in place.

Using pre-drilled holes for riveting can cause future issues with the integrity of the joint. Problems associated with pre-drilled holes include issues such as, but not limited to, drilling with the wrong size drill bit, drilling of the intended pre-drilled hole center mark, and forgetting to deburr holes in the workpieces, which can create debris within the hole and thus the joint. Additionally, in situations where flush riveting is necessary, forgetting to provide a top and/or bottom dimple or making a machined-countersunk hole too shallow or too deep can cause future problems with the joint. Moreover, the need for pre-drilled holes can add significant cost and time to a manufacturing process.

Additionally, the use of pre-drilled holes can increase possible galvanic corrosion of the workpieces. When dissimilar workpieces come into contact with one another in the presence of an electrolyte (e.g., water), an electrochemical process known as a galvanic reaction occurs. The galvanic reaction, known as galvanic corrosion, corrodes one metal at a faster rate and the other more slowly. The rate of corrosion depends upon a) the difference in electrical potential of the conductors, b) the conductivity of the electrolyte and c) the relative sizes of the contacting areas.

Joining composite workpieces, especially an electrically conductive composite workpiece, with rivets require special efforts to minimize or prevent the galvanic corrosion. Often galvanic corrosion can be associated with noise generated by contact and sealing of the joined workpieces. The corrosion on the surface area where the rivet joins the workpieces can cause noise (e.g., a grinding or squeaking) and issues with sealing the workpieces. Additionally, in environments high in moisture content (e.g., air conditioners) galvanic corrosion can cause pre-mature break down at the joined location of the workpieces (i.e., at the rivet), causing possible failure of the joint.

Previous attempts have been tried to reduce and/or avoid galvanic corrosion, where corrosion becomes a threat to the serviceability of the joint, for example, incorporating a barrier between the workpieces. Barriers may include painted added to one or more portions of the workpieces, or washers and/or gaskets inserted between the workpieces to prevent direct contact. Adding a protective coating (e.g., anodic oxide finish) to the rivet shank has also been used in an effort to prevent galvanic corrosion.

Although barriers and coatings provide a corrosion-resistant finish, barriers and coatings increase the surface of the rivet shank because the barrier/coating is placed on the outer surface of the rivet body, which occupies more space than a base metal of the rivet body. An increased surface may create a potential issue of undesirably low machine tolerances or assembly tolerances. As an example, in the case of small holes threaded to accept a fastener (e.g., used when joining surfaces in aircraft or automotive industries), an outer surface coating may cause the rivet shank to bind within the threads of the hole. Moreover, when barriers and coatings are used, it is difficult to ensure that upon the insertion of the rivet the integrity of the barriers and coatings are maintained (e.g., not scratched). Scratches of the barriers and coatings may be created upon rivet insertion and form reactive sites for galvanic corrosion, thereby causing risks for noise and seal issues at the joint and premature failure of the joint.

SUMMARY

Given the aforementioned deficiencies, the need exists for a rivet which can reduce/prevent galvanic corrosion between two joined workpieces. The rivet would also create a cavity within the workpieces as installation occurs, without the use of a pre-drilled hole.

The present technology relates to a rivet assembly including a rivet body composed of a material and a mandrel composed of a different material than the rivet body.

The rivet body includes a rivet head and a rivet shank, both composed of a material configured to reduce and/or eliminate galvanic corrosion between the workpiece(s) and the rivet body. In one aspect, when the rivet body and at least one of the workpieces are conductive, the rivet body is composed of a material that reduces electrochemical pathways between the workpieces and the rivet body. However, when the rivet body is composed of a non-conductive material, electrochemical pathways can be eliminated between the rivet body and the conductive workpiece. Furthermore, the non-conductive the rivet body is configured to have a glass transition or melt transition temperature higher than that of the glass transition or melting transition of the workpiece(s).

The mandrel includes a mandrel shaft and a mandrel cap, each composed of a conductive material such as metal. The mandrel body allows connection of the mandrel body to an installation tool for insertion of the mandrel body and rivet body into one or more workpieces.

The rivet body receives a mandrel shaft through the rivet shank. The mandrel shaft includes a mandrel cap positioned in connection with the rivet shank. The mandrel shaft is received by the installation tool and the mandrel cap locally deforms the workpieces(s) through friction riveting to install the rivet body. During the friction riveting, the mandrel cap creates a cavity which progresses through an upper surface and a lower surface of the workpiece(s).

In some embodiments, the rivet shank includes one or more ridges, each having a different size than the rivet shank. The ridge(s) is configured to interlock with one workpiece or multiple workpieces. In some embodiments, the ridge(s) is composed of a material being the same or similar to that of the rivet shank. In alternate embodiments, the ridge(s) comprises a material being different in composition than the material of the rivet shank.

In some embodiments, rivet body further includes a washer in connection with the rivet head. The washer is configured to contact an upper surface of the workpiece to promote sealing.

The present technology also relates to a method of using the rivet body to join the workpiece(s) without the need of a pre-drilled hole. The method involves using friction riveting, which induces heat generated from the installation tool applying torque (e.g., a normal rotational force) to the rivet body. The fast-rotating rivet body is pushed into the workpiece(s) due to local deformation/melting where the mandrel cap contacts the workpiece(s). The use of friction riveting reduces and/or eliminates cracking of workpieces, e.g., composite workpiece(s), which can be brittle.

Other aspects of the present technology will be in part apparent and in part pointed out hereinafter.

DETAILED DESCRIPTION

As required, detailed embodiments of the present disclosure are disclosed herein. The disclosed embodiments are merely examples that may be embodied in various and alternative forms, and combinations thereof. As used herein, for example, exemplary, and similar terms, refer expansively to embodiments that serve as an illustration, specimen, model or pattern.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

In some instances, well-known components, systems, materials or methods have not been described in detail in order to avoid obscuring the present disclosure. Specific structural and functional details disclosed herein are therefore not to be interpreted as limiting, but merely as a basis for the claims and as a representative basis for teaching one skilled in the art to employ the present disclosure.

Phrasing such as 'configured to' perform a function, including in the claims, can include any or all of being sized, shaped, positioned in the arrangement, and comprising material to perform the function.

I. GENERAL OVERVIEW OF HYBRID RIVET—FIG. 1

Figure 1:
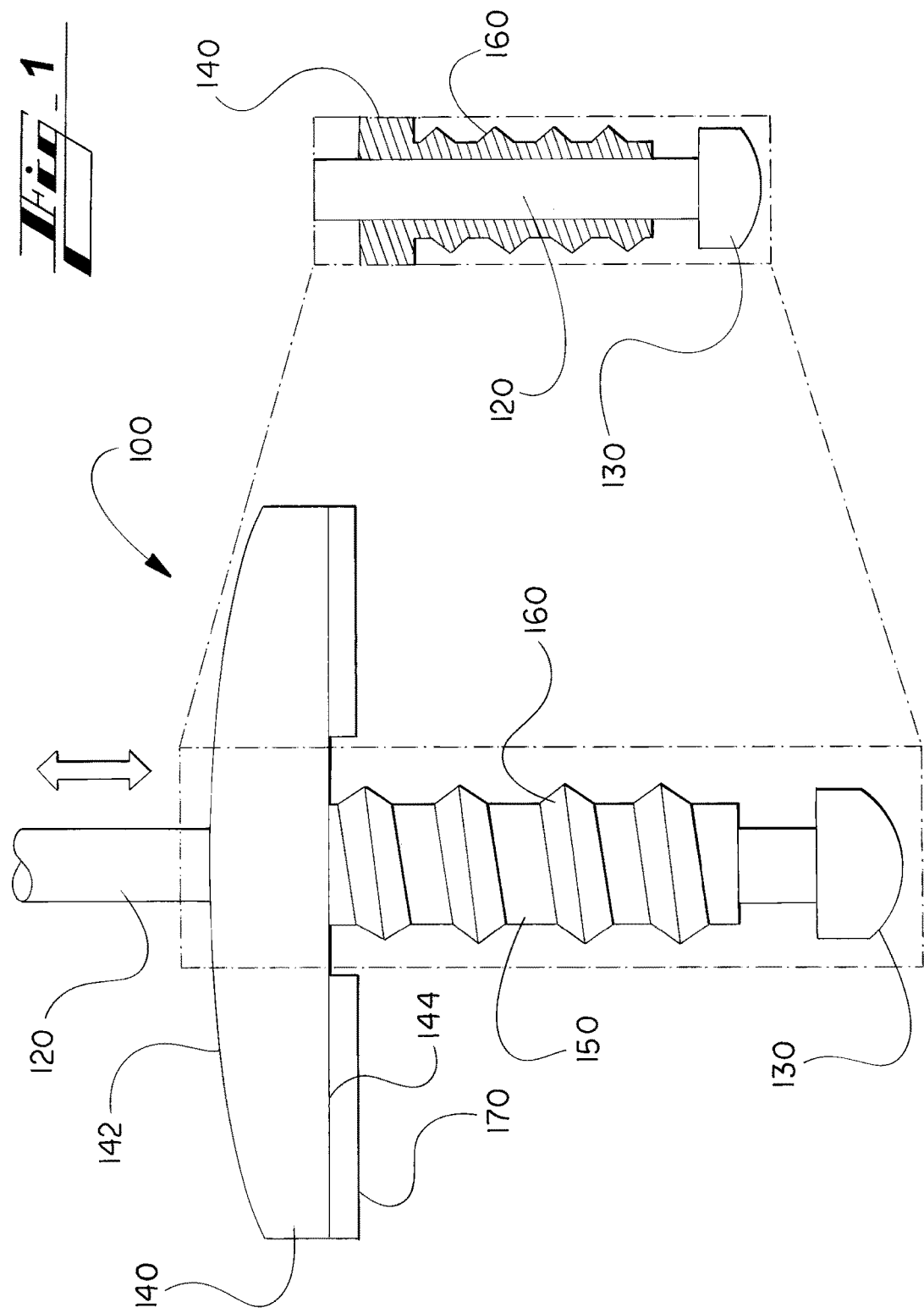
FIG. 1 illustrates a schematic side view of an exemplary embodiment of a rivet including a vertical cross-section callout.

Turning to the figures, and more specifically the first figure, FIG. 1 illustrates a hybrid rivet assembly 100 (hereinafter rivet assembly 100), including a rivet body made of a material different than a mandrel body.

The rivet body includes a rivet head 140 connected to a rivet shank 150. The rivet head 140 is configured such that a tool (e.g., an installation tool like that shown in FIG. 2) can engage the hybrid rivet assembly 100 at or near an upper surface 142 of the rivet head 140 and apply torque to the rivet head 140 and the rivet shank 150, causing the hybrid rivet assembly 100 to push through workpieces to form a joint.

The rivet head 140 can have any of a number of shapes, depending on a particular use. The rivet head 140 can include a countersunk head, a large flange, or a dome head (low-profile or otherwise), among others. For example, the rivet head 140 can be dome-shaped with a diameter sized to create a desired retention strength of the joint, which is a function of an overhang distance between an outer diameter of the rivet shank 150 and an outer diameter of the rivet head 140.

The rivet shank 150 is attached to a lower surface 144 of the rivet head 140, opposite the upper surface 142 of the rivet head 140.

The rivet shank 150 includes a diameter smaller than that of the rivet head 140. Specifically, the rivet shank 150 has a diameter that promotes relatively easy puncturing of a surface and passing through the surface of the workpieces.

In some embodiments, the rivet head 140 and/or the rivet shank 150 may include a non-conductive material. Using a non-conductive material eliminates electrochemical pathways that lead to galvanic corrosion.

The material of the rivet head 140 and/or the rivet shank 150 should be such that a phase transformation (e.g., glass transition of a polymer composite) of the hybrid rivet assembly 100 occurs at a temperature higher than a phase transformation (e.g., glass transition or melting transition) of the workpieces (e.g., polymer or metal). Stated another way, the rivet head 140 and/or the rivet shank 150 have a glass transition or melt transition temperature higher than that of the glass transition or melting transition of the workpieces. For example, the rivet head 140 and/or the rivet shank 150 may include polymers such as polyvinyl chloride (PVC), polyethylene, silicone, polyamide, polyether ether ketone (PEEK), polyetherimide (PEI), or the like, having phase transformation temperatures higher than the workpieces that the hybrid rivet assembly 100 would be used to join.

Where the rivet head 140 and/or the rivet shank 150 comprise a non-conductive material, the rivet head 140 and/or the rivet shank 150 may include reinforced fibres (e.g., fibre-reinforced polymer). The fibres are of a material that can be incorporated into the material of the rivet head 140 and/or the rivet shank 150 in a two-dimensional or three-dimensional matrix using known textile processing techniques such as weaving, knitting, braiding, and stitching, among others. For example, the fibres can include materials such as, but not limited to, glass, carbon, basalt, aramid, paper, and wood.

In other embodiments, the rivet head 140 and/or the rivet shank 150 include a conductive material that reduces electrochemical pathways between the workpieces and the rivet head 140 and/or rivet shank 150. For example, the rivet head 140 and/or the rivet shank 150 may include a material that has a similar electrode potential as at least one of the workpieces.

In some embodiments, it is desirable to increase interlock of the hybrid rivet assembly 100 with the workpieces.

In some embodiments, increased interlock with workpieces is accomplished through the rivet shank 150 including one or more ridges or threads 160. In some implementations, the ridge(s) is separate from and connected to the rivet shank 150, and in some implementations they are unitary. The ridge(s) 160 facilitates and assists with the rivet shank 150 interlocking with the workpieces during entry. The interlocking of the rivet shank 150 secures the positioning of the hybrid rivet assembly 100 within the workpieces. Secure positioning of the hybrid rivet assembly 100 can reduce unnecessary movement thus reducing air and/or moisture that is introduced into the joint, which may contribute to galvanic corrosion. Additionally, secure positioning of the hybrid rivet assembly 100 can reduce noise caused by damage to the surface area where galvanic corrosion has occurred. Moreover, the workpieces exhibit different thermo-mechanical properties because of their dissimilar composition. In particular, the coefficient of thermal expansion and deformation (creep) properties correlate to dimensional changes based on exposure temperature and forces of the workpieces. Interlocking the workpieces may provide a method for counteracting these dimensional changes and property differences, thereby insuring longer life to the joint.

The ridge(s) 160 can have a size slightly larger diameter than a primary, or shaft, diameter of the rivet shank 150. Alternately, one or more of the ridge(s) 160 can have a smaller diameter or a different shape than the shaft of the rivet shank 150. A difference in diameter between the rivet shank 150 and the ridge(s) 160 allows the ridge(s) 160 to interlock with the workpieces, as described in association with FIG. 2.

The material of the ridge(s) 160 can be manufactured as part of the rivet shank 150, creating a single unit shank and ridge combination. For example, the material of the ridge(s) 160 can be the same or similar material as that of the rivet shank 150. Specifically, the material of the ridge(s) 160 may be the same polymer materials used within the rivet shank 150. Additionally, the ridge(s) may have other similar characteristics as the rivet shank 150 including, a similar melting point, a similar rigidness, among others.

Alternately, the ridges(s) 160 can be attached to the rivet shank 150 in a subsequent process (e.g., attached as a sleeve pulled over the rivet shank 150) prior to inserting the hybrid rivet assembly 100 into the workpieces. Stated another way, the material of the ridge(s) 160 may be a different material than the material used within the rivet shank 150. However, where the material of the ridge(s) 160 and the rivet shank 150 differ, the material of the ridge(s) 160 should have similar material properties (e.g., hardness, thermal conductivity, and the like) as the material of the rivet shank 150.

Although the ridge(s) 160 are described as having a diameter and a circumference, implying a circular cross-section, rivet head 140, the rivet shank 150, and/or the ridge(s) 160 may include other shapes such as, but not limited to, triangular, oval, hexagonal, and the like. For example, using shaped ridge(s) 160 may be beneficial in applications, for example, where interlock between the hybrid rivet assembly 100 and joined workpieces are desired or the hybrid rivet assembly 100 is inserted without the use of a rotational installation tool. When a shaped cross section is not approximately circular, a hole formed by the mandrel cap 130/mandrel shaft 120 will likely be larger than the shank creating a risk for joint failure, tolerance issues, noise, seal, among others. In situations where the rivet shank 150, and/or the ridge(s) 160 are non-circular, the mandrel cap 130 may be oversized to ensure, upon removal for the mandrel shaft 120 during upsetting (mushrooming) of the rivet shank 150, the mandrel cap 130 is larger than the formed hole.

Figure 2:
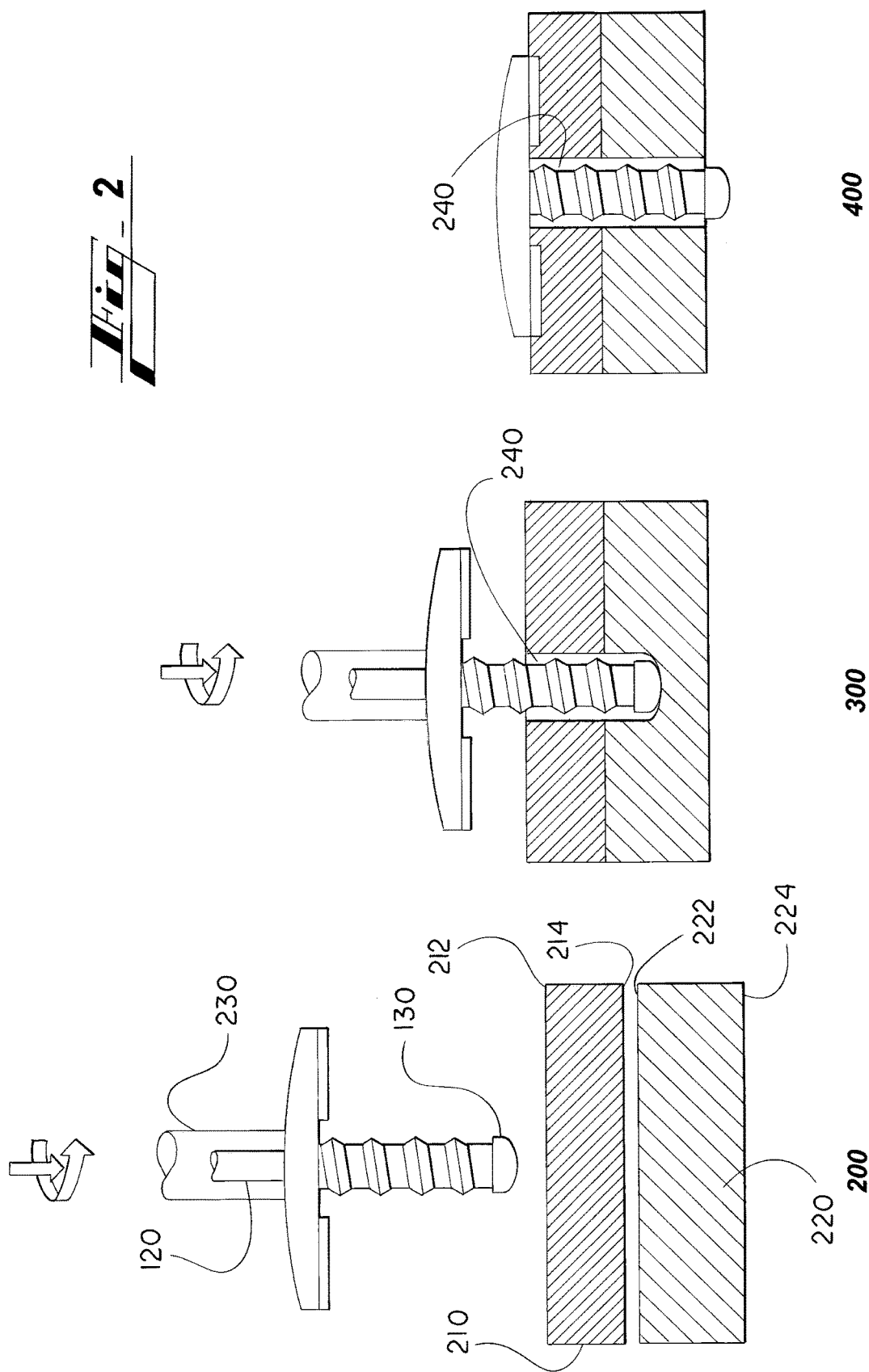
FIG. 2 shows the arrangement of FIG. 1 as used to join two workpieces together.

In some embodiments, increased interlock with workpieces is accomplished through one or more washer(s) 170 in contact with the lower surface 144 of the rivet head 140. The washer 170 is positioned such that one side of the washer 170 is in contact with the lower surface 144 of the rivet head 140 and the other side of the washer 170 is in contact with a surface of a workpiece, upon installation, as seen in FIG. 2.

The washer 170 can be used to secure the bond between the rivet head 140 and a workpiece, thus preventing a gap from forming between the rivet head 140 and the workpiece. In addition to filling the gap between the rivet head 140 and the workpiece, the washer 170 may also function as a buffer to prevent electromechanical contact between the rivet head 140 material, typically metal, and the workpiece, which may cause galvanic corrosion over time.

The washer 170 may comprise an adhesive (fully or partially cured) or other adhering material used to bond the washer 170 to bottom side of the rivet head 140. The washer 170 can include, for example, fully cured or partially cured epoxy, urethane, acrylate resins, foamed tape, sprayed on pressure sensitive adhesive layers, and the like.

The mandrel includes a mandrel shaft 120 connected to a mandrel cap 130. The mandrel shaft 120 may pass through the center of the rivet body. As seen in the callout of FIG. 1, the mandrel shaft 120 extends through the length of the rivet body and connects to the mandrel cap 130, located on a bottom surface of the mandrel shaft 120. In practice, the mandrel shaft 120 and the mandrel cap 130 can be formed as one piece.

The mandrel shaft 120 is a length longer than the rivet body, thus allowing the mandrel shaft 120 to slide up and down the length of the rivet body (denoted by the two-way arrow). As described below, when the rivet body is ready for use, the mandrel shaft 120 is pulled drawing the mandrel cap 130 to the bottom of the rivet shank 150. Specifically, the mandrel cap 130 is in contact with a bottom surface of the rivet shank 150, opposite the rivet head 140 (seen in step 200 of FIG. 2).

In further embodiments, a portion of the mandrel shaft 120 may break away from mandrel cap 130 at a pre-determined break load. The break load is designed to prevent too much force being developed, which may damage the workpieces being joined. Typically, the break load is greater than a force used to join workpieces (e.g., a clamping force). A break load less than the clamping force may compromise joint integrity.

The mandrel shaft 120 is of a diameter that allows passage through the rivet head 140 and the rivet shank 150. Specifically, the diameter of the mandrel shaft 120 is smaller than the diameter of the rivet head 140 and the rivet shank 150.

The mandrel cap 130 is shaped to attach to the mandrel shaft 120. As stated above, the mandrel shaft 120 and the mandrel cap can be formed as one piece. Additionally, the mandrel cap 130 is of a diameter that it does not fully pass through the rivet shank 150 upon installation of the rivet body. Said another way, the mandrel cap 130 has a diameter larger than that of the mandrel shaft 120 and larger than that of the rivet shank 150, so as to allow upsetting (mushrooming) of the rivet body.

The material of the mandrel shaft 120 and/or the mandrel cap 130 should ensure workpieces are secured during clamping and constrained during servicing of the joint. Additionally, the mandrel shaft 120 and/or the mandrel cap 130 may be made of a material that is stronger than the material of the workpieces to be joined. Strength of the mandrel shaft 120 and the mandrel cap 130 can be evaluated using any number of material mechanics, such as but not limited to yield strength and ultimate strength. A stronger material allows the mandrel shaft 120 and the mandrel cap 130 to maintain their geometric integrity while fully penetrating the workpieces during a joining process, described below. For example, the mandrel can comprise materials including, but not limited to, steel, stainless steel, carbon steel, copper, aluminum, brass, and the like.

II. PROCESS FOR FRICTION RIVETING—FIG. 2

FIG. 2 illustrates the process of joining a first workpiece 210 and a second workpiece 220 using the hybrid rivet assembly 100. The first workpiece 210 and the second workpiece 220 may be similar in material structure. In one embodiment, the first workpiece 210 and the second workpiece 220 both comprise a polymer composite material. In another embodiment, the first workpiece 210 has a different material than the second workpiece 220. For example, the first workpiece 210 may be a composite material, while the second workpiece 220 may be an aluminium alloy.

In some embodiments, one or more of the workpieces 210, 220 may include but are not limited to polymers such as (functionalized) polycarbonate, polyolefin (e.g., polyethylene and polypropylene), polyamide (e.g., nylons), polyacrylate, and acrylonitrile butadiene styrene.

In other embodiments, one or more of the workpieces 210, 220 may include, but are not limited, to composites such as reinforced plastics where the plastics may include any of the exemplary polymers listed above, and the reinforcement may include one or more of the following clay, glass, carbon, polymer in the form of particulate, (nano, short, or long) fibres, (nano-sized or micron-sized) platelets, whiskers, among others.

At least one of the workpieces 210, 220 can include synthetic, or inorganic, molecules. While use of so-called biopolymers (or, green polymers) is increasing, petroleum based polymers are still much more common. Material of one or both of the workpieces 210, 220 may also include recycled material, such as a polybutylene terephthalate (PBT) polymer, which is about eighty-five percent post-consumer polyethylene terephthalate (PET). In one embodiment one or both of the workpieces 210, 220 includes some sort of plastic. In one embodiment, the material includes a thermo-plastic.

In one embodiment one or both of the workpieces 210, 220 includes a composite. For example, in one embodiment one or both of the workpieces 210, 220 includes a fibre-reinforced polymer (FRP) composite, such as a carbon-fibre-reinforced polymer (CFRP), or a glass-fibre-reinforced polymer (GFRP). The composite may be a fibreglass composite, for instance. In one embodiment, the FRP composite is a hybrid plastic-metal composite. The material in some implementations includes a polyamide-grade polymer, which can be referred to generally as a polyamide. Material of one or both of the workpieces 210, 220 may also include includes polyvinyl chloride (PVC). In one embodiment, the material of one or both of the workpieces 210, 220 includes acrylonitrile-butadiene-styrene (ABS). In one embodiment, the material of one or both of the workpieces 210, 220 includes a polycarbonate (PC). Material of one or both of the workpieces may also comprise a type of resin. Example resins include a fibreglass polypropylene (PP) resin, a PC/PBT resin, and a PC/ABS resin.

The first workpiece 210 includes an upper surface 212 and a lower surface 214, and the second workpiece 220 includes an upper surface 222 and a lower surface 224. The lower surface 214 of the first workpiece 210 and the upper surface 222 of the second workpiece contact upon joining of the workpieces 210, 220 and are securely held with the hybrid rivet assembly 100.

As seen at step 200 in FIG. 2, to join the workpieces 210, 220, the hybrid rivet assembly 100 is first placed into an installation tool 230. Activating the installation tool 230 pulls the mandrel shaft 120, drawing the mandrel cap 130 into the rivet shank 150 of the hybrid rivet assembly 100. Specifically, the mandrel cap 130 is in contact with a bottom surface of the rivet shank 150. When properly positioned, the mandrel cap 130 has one end attached to the mandrel shaft 120 and another end approximately near the upper surface 212 of the first workpiece 210.

At step 200, the installation tool 230 provides torque that causes the mandrel cap 130 and the rivet shank 150 to penetrate the workpieces 210, 220, creating a cavity 240. The cavity 240 is formed by the mandrel shaft 120, including the mandrel cap 130, which penetrates each workpiece 210, 220 to allow entry of the rivet shank 150. As seen, the cavity 240 becomes the same shape and size as the rivet shank 150. As stated above, to allow penetration of the workpieces 210, 220, the mandrel shaft 120 and the mandrel cap 130 should be a material that is stronger than each workpieces 210, 220 at any temperature reached during the insertion process.

During friction riveting, the hybrid rivet assembly 100 is brought into contact with the upper surface 212 of the first workpiece 210 by the installation tool 230, which applies an amount of torque, to the hybrid rivet assembly 100, which is dependent on the composition of the workpieces 210, 220. Specifically a normal force (e.g., a feed rate of approximately 120 to 900 millimeters per minute) and/or rotational force (e.g., a spindle speed of approximately 9,000 revolutions per minute) are applied to the hybrid rivet assembly 100. Frictional heating of the material in the first workpiece 210 is generated when the hybrid rivet assembly 100 rotates when being inserted into the first workpiece 210 by the installation tool 230. When the amount of heat generated becomes equal or greater than the softening (e.g., glass or melting transition temperature) of the first workpiece 210, the material of the first workpiece 210 soften and further deforms. Local softening and/or melting allows the hybrid rivet assembly 100 to penetrate into the first workpiece 210 under the torque applied by the installation tool 230, without the need for a pre-drilled hole. A similar friction riveting process occurs with the second workpiece 220. The material of the second workpiece 220 is locally melted and/or deformed allowing the hybrid rivet assembly 100 to penetrate into the second workpiece 220, thus continuing the cavity 240. In some embodiments, the rivet shank 150 may interlock with the second workpiece 220 to insure that the hybrid rivet assembly 100 maintains compression on both of the workpiece 210, 220. Interlocking with the second workpiece 220 would provide a result similar to when working with a screw (e.g., a drywall anchor).

Friction riveting allows secure positioning of the hybrid rivet assembly 100, within the workpieces 210, 220, which can reduce unnecessary movement of the hybrid rivet assembly 100, as seen with pre-drilled holes. When unnecessary movement is reduced, the effects of galvanic corrosion is also reduced, because air and/or electrolytes (e.g., water) are not introduced into the joint. Specifically, the hybrid rivet assembly 100 can reduce unnecessary moisture that is introduced when joining workpieces 210, 220.

Finally, as seen in step 400, the mandrel shaft 120 reaches a predetermined break-load, with a portion of the mandrel shaft 120 breaking away and being removed from the set rivet assembly 100. In some embodiments, the mandrel cap 130 remains encapsulated at or near the lower surface 224 of the second workpiece 220.

It is understood by one of skill in the art that the above process can be used to install the hybrid rivet assembly 100 into one workpieces (e.g., the first workpiece 210) or multiple workpieces (e.g., the first workpiece 210, the second workpiece 220, and/or a third workpiece). The hybrid rivet assembly 100 can be used to sure the multiple workpieces together.

III. SELECTED FEATURES

Many features of the present technology are described herein above. The present section presents in summary some selected features of the present technology. It is to be understood that the present section highlights only a few of the many features of the technology and the following paragraphs are not meant to be limiting.

The technology reduces galvanic corrosion formed between workpieces and the rivet. Reduction of galvanic corrosion increases long-term performance of the joined materials, and reduces audible sounds associated with material affected by galvanic corrosion.

The technology also eliminates the need for pre-drilled holes within composite material workpieces, specifically carbon fibre composite workpieces. Within the technology, a cavity is formed within the workpieces as the rivet is inserted, thus eliminating the need for pre-drilled holes to receive the rivet. The elimination of pre-drilled holes can prevent problems such as reworking to re-tap a pre-drilled hole to receive the original rivet or reworking a workpiece to fabricate a larger hole to receive a larger rivet.

The technology also reduces the weight of the rivet. Within the technology, the rivet shank is manufactured from a polymer, or similar material, which has a lower weight than traditional metal-based shanks. Reducing the weight of the rivet can allow use of the rivet in situations of particular weight requirement (e.g., aircraft and automotive industries).

IV. CONCLUSION

Various embodiments of the present disclosure are disclosed herein. The disclosed embodiments are merely examples that may be embodied in various and alternative forms, and combinations thereof.

The above-described embodiments are merely exemplary illustrations of implementations set forth for a clear understanding of the principles of the disclosure.

Variations, modifications, and combinations may be made to the above-described embodiments without departing from the scope of the claims. All such variations, modifications, and combinations are included herein by the scope of this disclosure and the following claims.

What is claimed is:

1. An apparatus, for joining a first workpiece and a second workpiece, comprising:

a rivet body comprising (i) a rivet head having an upper surface and a lower surface, wherein the lower surface is opposite the upper surface and configured to be positioned near or in contact with an upper surface of the first workpiece when the apparatus is used to join the workpieces, and (ii) a rivet shank attached to the lower surface of the rivet head, wherein the rivet body is at least partially composed of a non-conductive material that eliminates electrochemical pathways between the rivet body and at least one of the first and second workpieces and the rivet body; and a mandrel comprising (i) a mandrel shaft configured to be positioned within at least a portion of the rivet shank, and (ii) a mandrel cap positioned on a portion of the mandrel shaft that is in contact with the rivet shank, wherein the mandrel cap is composed of a cap material having a hardness greater than that of the first and the second workpieces, thereby allowing passage of the mandrel cap through the first and second workpieces.

2. The apparatus of claim 1 wherein the mandrel cap, when used for joining the workpieces, creates a cavity progressing in the workpieces extending from the upper surface of the first workpiece, past a lower surface of the first workpiece and an upper surface of the second workpiece, and to or beyond a lower surface of the second workpiece.

3. The apparatus of claim 1 wherein:

the rivet shank has a first diameter;

the mandrel shaft has a second diameter differing from the first diameter;

the rivet shank has a ridge extending from the rivet shank; and the ridge is configured to interlock with one or both of the first workpiece and the second workpiece.

4. The apparatus of claim 3 wherein the ridge comprises a ridge material being the same or similar in composition to the non-conductive material of the rivet body.

5. The apparatus of claim 3 wherein the non-conductive material of the rivet body is a first non-conductive material and the ridge comprises a second non-conductive material differing from the first non-conductive material.

6. The apparatus of claim 1 further comprising a washer adjacent the lower portion of the rivet head and configured to contact the upper surface of the first workpiece when the apparatus is used to join the workpieces.

7. A system, for joining a first workpiece and a second workpiece, comprising:

a rivet body comprising (i) a rivet head having an upper surface and a lower surface, wherein the lower surface is opposite the upper surface and configured to be positioned near or in contact with an upper surface of the first workpiece when the rivet body is used to join the workpieces, and (ii) a rivet shank, attached to the lower surface of the rivet head, wherein the rivet body is at least partially composed of a non-conductive material that eliminates electrochemical pathways between the rivet body and at least one of the first and second workpieces and the rivet body; and a mandrel comprising (i) a mandrel shaft configured to be positioned within at least a portion of the rivet shank and the rivet head, and (ii) a mandrel cap positioned on a portion of the mandrel shaft that is in contact with the rivet shank and the head, wherein the mandrel cap is composed of a cap material having a hardness greater than that of the first and the second workpieces, thereby allowing passage of the mandrel cap through the first and second workpieces.

8. The system of claim 7 wherein the mandrel cap, when used for joining the workpieces, creates a cavity in the workpieces extending from the upper surface of the first workpiece, past a lower surface of the first workpiece and an upper surface of the second workpiece, and to or beyond a lower surface of the second workpiece.

9. The system of claim 7 wherein:
the rivet shank has a first diameter;
the mandrel shaft has a second diameter differing from the first diameter;
the rivet shank has a ridge extending from the rivet shank; and
the ridge is configured to interlock with one or both of the first workpiece and the second workpiece.

10. The system of claim 9 wherein the ridge comprises a ridge material being the same or similar in composition to the non-conductive material of the rivet body.

11. The system of claim 9 wherein the non-conductive material of the rivet body is a first non-conductive material and wherein the ridge comprises a second non-conductive material differing from the first non-conductive material.

12. A method, for joining a first workpiece and a second workpiece, comprising:
positioning, near an upper surface of the first workpiece, a mandrel configured to be received through at least a portion of a rivet body,
the rivet body comprising a rivet shank, having a diameter, and a rivet head comprising an upper surface and a lower surface, the lower surface of the rivet head becoming located in the positioning near the upper surface of the first workpiece, wherein the rivet body is at least partially composed of a non-conductive material that eliminates electrochemical pathways between the rivet body and at least one of the first and second workpieces and the rivet body; and
the mandrel comprising a mandrel shaft and a mandrel cap that is positioned on a portion of the mandrel shaft in connection with the rivet shank, wherein the mandrel cap is composed of a cap material having a hardness greater than that of the first and the second workpieces, thereby allowing passage of the mandrel cap through the first and second workpieces; and
applying, to the upper surface of the rivet head, a torque such that the mandrel cap generates frictional heat at the upper surface of the first workpiece, the frictional heat deforming the upper surface of the first workpiece and creating a cavity extending into the first workpiece from the upper surface of the first workpiece.

13. The method of claim 12 wherein, in the applying, the friction heat generated causes the mandrel cap to create a cavity in the workpieces extending from the upper surface of the first workpiece, past a lower surface of the first workpiece and an upper surface of the second workpiece, and to or beyond a lower surface of the second workpiece.

14. The method of claim 13 wherein the rivet shank has a first circumference and the mandrel shaft further comprises a ridge about a second circumference, the second circumference of a different size than the first circumference, wherein the ridge is configured to interlock with the first workpiece or the second workpiece.

15. The method of claim 14 wherein the ridge is of a material similar in composition to the material of the rivet shank.

16. The method of claim 14 where the ridge is of a material different in composition from the material of the rivet shank.

17. The method of claim 13 wherein the rivet shank has a first circumference and the mandrel shaft further comprises a ridge about a second circumference, the second circumference of a different size than the first circumference, wherein the ridge is configured to interlock with the first workpiece and the second workpiece.

18. The method of claim 17 wherein the ridge is of a material similar in composition to the material of the rivet shank.

19. The method of claim 17 where the ridge is of a material different in composition from the material of the rivet shank.

20. The method of claim 12 further comprising a washer adjacent the lower portion of the rivet head and configured to contact the upper surface of the first workpiece when the method is used to join the workpieces.

* * * * *